(No Model.)

E. W. OTIS.
SKATE ROLLER.

No. 285,836. Patented Oct. 2, 1883.

Witnesses!
A. Fawcett
L. J. White.

Inventor!
Elisha W. Otis
Per C. C. Shaw
Atty.

UNITED STATES PATENT OFFICE.

ELISHA W. OTIS, OF CHELSEA, MASSACHUSETTS.

SKATE-ROLLER.

SPECIFICATION forming part of Letters Patent No. 285,836, dated October 2, 1883.

Application filed July 20, 1883. (No model.)

*To all whom it may concern:*

Be it known that I, ELISHA W. OTIS, of Chelsea, in the county of Suffolk, State of Massachusetts, have invented a certain new and useful Improvement in Skate-Rollers, of which the following is a description sufficiently full, clear, and exact to enable any person skilled in the art or science to which said invention appertains to make and use the same, reference being had to the accompanying drawings, forming a part of this specification, in which—

Figure 1:
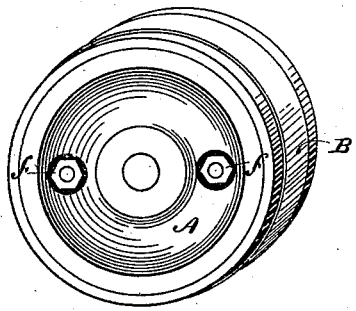
Figure 2:
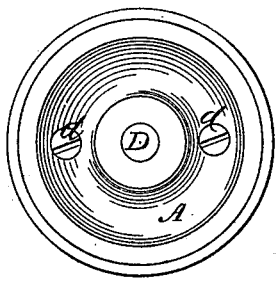
Figure 3:
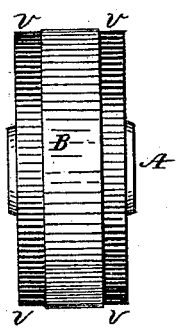
Figure 4:
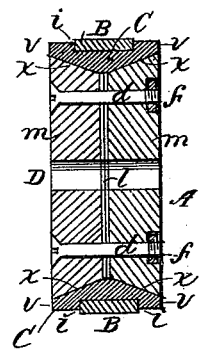

Figure 1 is an isometrical perspective view of my improved roller; Fig. 2, a side elevation of the same; Fig. 3, an edge view; Fig. 4, a vertical transverse section; and Figs. 5 and 6, sectional views, showing modifications of the improvement.

Like letters of reference indicate corresponding parts in the different figures of the drawings.

My invention relates to that class of rollers which are employed in the manufacture of roller or parlor skates; and it consists in a novel construction and arrangement of parts, as hereinafter more fully set forth and claimed, by which a more effective article of this character is produced than is now in ordinary use.

The nature and operation of the improvement will be readily understood by all conversant with such matters from the following explanation, its extreme simplicity rendering an elaborate description unnecessary.

In the drawings, A represents the body of the roller, B the tire, and C the cushion.

The body is preferably composed of wood, and is constructed in two corresponding sections or halves, $m\,m$, which have their peripheries inwardly beveled or chamfered, as shown at $x\,x$, and are connected by the transversely-arranged bolts $d$ and nuts $f$.

Fitted into the groove formed by the bevels $x$ around the body of the roller there is a band or cushion, C, composed of elastic rubber, and provided on its face with the annular groove $i$ for receiving the tire B.

The tire is flat, and may be composed of iron, steel, brass, or any other suitable material, being slightly thicker than the depth of the groove $i$, in which it rests, and preferably about two-thirds as wide as the cushion C, the face of which, at all points, is in the axial line of the roller.

In constructing the roller the tire B is first inserted in the groove $i$ of the cushion C, after which the sections $m\,m$, forming the body A, are placed on the opposite sides of the cushion, with their beveled edges inward, and secured by means of the bolts and nuts $d\,f$, in a manner which will be readily obvious without a more explicit description. The inner faces of the sections $m$ are removed, or the sections constructed of such a thickness that a space, $l$, is left between them to enable a strain to be obtained on the tire by forcing the cushion C outwardly as the nuts are turned in, the beveled edges $x$ acting against the corresponding inclines or bevels on the under side of the cushion to press the same diagonally against the under side of the tire, and also to elevate the extreme outer edges, $v$, of the cushion, thereby tightening the tire, and also furnishing a firm bearing for the edges and compensating for their wear. The roller is provided with a hole, D, for receiving an ordinary axle-pin, and is designed to bear on the tire B; but in turning, and also in performing fancy skating, when the body of the roller is inclined, the edges $v$ are brought to bear, and the skater thereby prevented from slipping.

It will be obvious that the rubber cushion will act as a spring to receive and absorb the jar caused by the roller passing over any inequalities in the floor; also, that when the edges become badly worn a new cushion may be readily substituted.

I do not confine myself to the use of the bolts and nuts for securing the sections of the body, as other means may be employed for that purpose; neither do I confine myself to the special form of the cushion C or the bevels $x$, as these may be varied considerably without departing from the spirit of my invention.

Figure 5:
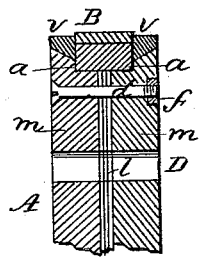

In Fig. 5 the edges $v$ are constructed independent of the body of the cushion C, the cushion being let into a rabbet or socket, $a$, formed in the sections $m$.

Figure 6:
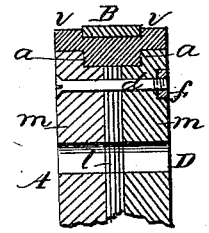

In Fig. 6 the body and edges of the cushion are integral, or formed in one piece, but the outer edges of the sections $m$ are straight, or in parallelism with the face of the tire B, and a rabbet or socket, $a$, is formed in the sections to receive the body of the cushion; but as I propose to make the modifications of my improvement, as shown in Figs. 5 and 6, the subject-matter of other Letters Patent I do not claim the same specifically in this application.

Having thus explained my invention, what I claim is—

1. The improved skate-roller herein described, the same consisting of the body A, cushion C, tire B, bolts $d$, and nuts $f$, constructed, combined, and arranged to operate substantially as set forth.

2. A skate-roller having a body provided with an annular elastic cushion around its periphery, and a tire of less width than the cushion disposed around the same, in combination with means for forcing the cushion outwardly against the tire and supporting the projecting edges of the cushion, substantially as specified.

3. In a skate-roller substantially such as described, an annular elastic cushion disposed around the body of the roller, and provided with a groove for receiving the tire, substantially as set forth.

4. In a skate-roller substantially such as described, the body A, composed of the two sections $m\ m$, having the beveled edges $x$ for receiving the tire and cushion, and provided with nuts and bolts or means for forcing the sections inwardly to expand the cushion and tighten the tire, substantially as set forth.

ELISHA W. OTIS.

Witnesses:
C. A. SHAW,
L. J. WHITE.